(12) United States Patent
Bhatia et al.

(10) Patent No.: US 12,316,661 B2
(45) Date of Patent: May 27, 2025

(54) AUTO-DETECTION OF OBSERVABLES AND AUTO-DISPOSITION OF ALERTS IN AN ENDPOINT DETECTION AND RESPONSE (EDR) SYSTEM USING MACHINE LEARNING

(71) Applicant: International Business Machines Corporation, Armonk, NY (US)

(72) Inventors: Aankur Bhatia, Bethpage, NY (US); Abhishek Basu, Kolkata (IN); Luiz Marcel Arbos, Warsaw (PL); Terry Liggett, Henderson, NV (US); Kyle Proctor, Holly, MI (US)

(73) Assignee: International Business Machines Corporation, Armonk, NY (US)

( * ) Notice: Subject to any disclaimer, the term of this patent is extended or adjusted under 35 U.S.C. 154(b) by 296 days.

(21) Appl. No.: 17/976,920

(22) Filed: Oct. 31, 2022

(65) Prior Publication Data
US 2024/0146746 A1 May 2, 2024

(51) Int. Cl.
*H04L 9/40* (2022.01)

(52) U.S. Cl.
CPC ...... *H04L 63/1425* (2013.01); *H04L 63/1416* (2013.01); *H04L 63/1441* (2013.01)

(58) Field of Classification Search
CPC ............. H04L 63/1425; H04L 63/1416; H04L 63/1441; G06F 18/00; G05B 2219/33044
See application file for complete search history.

(56) References Cited

U.S. PATENT DOCUMENTS

| | | | |
|---|---|---|---|
| 8,762,298 B1 * | 6/2014 | Ranjan | G06F 21/552 706/12 |
| 10,699,012 B2 | 6/2020 | Kashyap et al. | |

(Continued)

FOREIGN PATENT DOCUMENTS

WO  2020046575 A1  3/2020

OTHER PUBLICATIONS

International Searching Authority, "Notification of Transmittal of the International Search Report and the Written Opinion of the International Searching Authority, or the Declaration", International Application No. PCT/CN2023/127565, International Filing Date, Oct. 30, 2023, Date of Mailing: Jan. 10, 2024, 7 pages.

(Continued)

*Primary Examiner* — Ghodrat Jamshidi
(74) *Attorney, Agent, or Firm* — Gavin Giraud

(57) ABSTRACT

A technique for threat response associated with an endpoint detection and response (EDR) system. The system uses a combination of automated observable detection, threat intelligence enrichment, graph analysis, and supervised machine learning to machine-predict analyst behavior in classifying (as 'true' or 'false' positives) the EDR alerts, and to support either (i) automated suppression of those alerts that the system classifies with sufficient confidence as either true or false, or (ii) for those alerts than cannot be so classified, the providing of recommendations to analysts to facilitate their activities. Auto-detection of observables for graph-based feature detection, together with the automated disposition of alerts where possible greatly reduces overall analyst workload for the EDR system. Further, and even where a machine-based prediction does not have sufficient confidence to enable bypassing the analyst, the system provides the analyst with additional context and enrichment to facilitate expedited (or at least more efficient) alert handling.

20 Claims, 10 Drawing Sheets

(56) References Cited

U.S. PATENT DOCUMENTS

| | | | |
|---|---|---|---|
| 10,728,261 B2 | 7/2020 | Paine | |
| 11,290,483 B1* | 3/2022 | Kannan | H04L 63/1433 |
| 11,843,624 B1* | 12/2023 | Estep | G06N 3/09 |
| 12,074,897 B1* | 8/2024 | Sánchez | G06N 20/00 |
| 2007/0209074 A1 | 9/2007 | Coffman | |
| 2018/0124098 A1* | 5/2018 | Carver | G06N 20/00 |
| 2018/0367561 A1 | 12/2018 | Givental | |
| 2019/0260804 A1* | 8/2019 | Beck | H04L 41/22 |
| 2020/0042700 A1* | 2/2020 | Li | G06F 21/554 |
| 2020/0112590 A1* | 4/2020 | Bhatia | G06N 3/042 |
| 2020/0327419 A1* | 10/2020 | Zhang | G06N 20/00 |
| 2020/0358792 A1 | 11/2020 | Bazalgette | |
| 2021/0126938 A1* | 4/2021 | Trost | G06F 21/552 |
| 2021/0281592 A1* | 9/2021 | Givental | G06N 20/10 |
| 2021/0304204 A1* | 9/2021 | Ramesh | G06F 18/217 |
| 2021/0306352 A1 | 9/2021 | Narula et al. | |
| 2022/0171995 A1* | 6/2022 | Balasubramanian | G06N 20/00 |
| 2022/0210168 A1 | 6/2022 | Yavo | |
| 2022/0292186 A1* | 9/2022 | Givental | G06F 21/554 |
| 2023/0102103 A1* | 3/2023 | Mazumder | G06N 7/01 726/23 |
| 2023/0147934 A1* | 5/2023 | Eddin | H04L 63/1416 705/64 |
| 2023/0224326 A1* | 7/2023 | Horesh | H04L 63/1416 726/23 |
| 2023/0275915 A1* | 8/2023 | Kaul | H04L 63/1425 726/23 |
| 2023/0283619 A1* | 9/2023 | Pikarski | H04L 63/1425 726/23 |
| 2023/0289877 A1* | 9/2023 | Paduchuru | G06Q 40/04 |
| 2023/0344863 A1* | 10/2023 | Shashivasan | H04L 63/1425 |
| 2023/0353587 A1* | 11/2023 | Bui | H04L 63/1416 |
| 2024/0013064 A1* | 1/2024 | Godden | G06N 3/0464 |
| 2024/0015062 A1* | 1/2024 | Damodaran | H04L 63/1416 |
| 2024/0129329 A1* | 4/2024 | Rafanavicius | H04L 63/1416 |

OTHER PUBLICATIONS

Tovarnak, et al., "ObservableDB: An Inverted Index for Graph-Based Traversal of Cyber Threat Intelligence," NOMS 2022-2022 IEEE/IFIP Network Operations and Management Symposium, 2022, pp. 1-4.

Rhode, et al., "Real-Time Malware Process Detection and Automated Process Killing," Security and Communication Networks vol. 2021, Article ID 8933681.

Kaur, et al., "Endpoint Detection and Response Using Machine Learning," Journal of Physics: Conference Series, vol. 2062, No. 1, 9 pages, IOP Publishing, 2021.

Shahi, "Tactics, Techniques and Procedures (TTPs) to Augment Cyber Threat Intelligence (CTI): A Comprehensive Study," St.Cloud State University, 2018.

Marco, "WFGen: Automated Generation of Workflows for Attack Hypotheses Testings," Masters Thesis, Ben-Gurion University of the Negev, 2020.

\* cited by examiner

| | |
|---|---|
| Customer ID | |
| Alert | 92015548 |
| Siem_Vendor | CROWDSTRIKE |
| attkDesc | MDR Alert |
| command_line_value | C:\Users\ \AppData\Local\Temp\dc87a180-a9a0-49ce-ac20-a40ec0ea1ca6\AutoUpdate.exe" |
| ConsoleURLValue | "C:\Users\ \AppData\Local\Temp\dc87a180-a9a0-49ce-ac20-a40ec0ea1ca6\ProdInfo.xml"" |
| CustNameValue | http://falcon.crowdstrike.com/activity/detections/detail/91044f1b82954f2a52efcb8f41ea5dd5/622770541090 |
| deviceNamevalue | |
| eventNames | Exploitation for Client Execution |
| ProcessGUID | pid: 91044f1b82954f2a52efcb8f41ea5dd5:6052595290080 |
| ProcessName | AutoUpdate.exe |
| MD5 | 23fe5402f14db9ed0e63823744ec7b41 |
| Description | Process AutoUpdate.exe was detected |
| Alert status | CLOSED |
| soc_ticket_id | NaN |
| Rule | CrowdStrikeOffenseRule_v1 |
| Signature | Exploitation for Client Execution |
| Date | |
| Week number | 31 |
| Signature count | 1 |

| | 802 |
|---|---|
| MD5_Risk | high |
| MD5_Positives | 21 |
| seen_ps1_sh | 0 |
| seen_download | 0 |
| cmd_scripts | 1 |
| encoded_command_seen | 0 |
| IP_found | Not Found |
| IP_Risk | 0 |
| command_line_cleaned | users redlab admin appdata roaming utorrent utorrent exe |

804

MD5 Risk - as enriched from XFE
MD5 Positives - % Positives hit on the MD5 signature - XFE
SEEN ps1_sh - If Powershell or Shell scripts seen in cmdline
Seen_download - If download or curl script seen in cmdline
Cmd_scripts - count of command scripts (semi colon separated_
Encoded_command_seen - If encoded (hash) command seen in cmdline
IP found - If IP found in Command Line
IP_Risk - IP reputation as determined from XFE

FIG. 8

AUTO-DETECTION OF OBSERVABLES AND AUTO-DISPOSITION OF ALERTS IN AN ENDPOINT DETECTION AND RESPONSE (EDR) SYSTEM USING MACHINE LEARNING

BACKGROUND OF THE INVENTION

Technical Field

This disclosure relates generally to the endpoint detection and response (EDR) system alert handling.

Background of the Related Art

Endpoint Detection and Response (EDR) systems are rule-based systems that work well in correlating endpoint activity on host systems and generating alerts for suspicious or malicious behaviors. One of the major drawbacks of these EDR systems, however, is that they can generate large volumes of detections ranging from many duplicates to false positives, causing analyst fatigue. Approximately 60-70% of alerts generated from these systems are suspicious behavioral activity that trigger from system administrators, custom applications or scripts, and reputation-based detections from next generation anti-virus (NGAV) sensors that can lead to a high volume of false positives until tuned. An analyst spends approximately 10 to 15 minutes evaluating and investigating these 'false positive' alerts, increasing the time required to triage and handle true positive detections. As a consequence, analyst fatigue and delayed investigations on more pertinent alerts occur, which may lead to extended losses for a customer in an actual cyber-attack on their host systems. Another drawback of EDR systems is that while they correlate suspicious events and malicious behavior, they do not do an adequate job of explaining anomalies, e.g., by contextualization and data enrichment. They rarely list out the suspicious observables in command lines that, for example, have a history of suspicious behavior exhibited previously. The task of enriching these suspicious observables with correct threat intelligence and asset context is left to the analyst carrying out the investigation, which further delays the response actions.

BRIEF SUMMARY

This disclosure provides for a method, apparatus and computer program product for suppressing alert volume and reducing time for alert processing in association with an Endpoint Detection and Response (EDR) system. The approach herein implements a machine-based prediction service (e.g., a microservice) that operates in association with or as part of the EDR system. In response to receipt of an alert from the EDR system, the body of the alert is analyzed to automatically detect one or more "observables" in the alert that are indicative of potentially suspicious activity. Representative observables include, for example, high-risk hashes, encoded commands, number of command scripts, the existence of IP addresses in command lines, presence of a Shell script, and the like. The set of one or more observables (e.g., the value of a hash, a particular IP address identified in a command line, etc.) identified in the alert body are then evaluated against a threat intelligence service, which service returns the set of observables (or at least some of them) enriched with additional information (gleaned from the threat intelligence service) and useful to evaluate a degree of risk that each such observable presents.

The set of observables and their threat intelligence service-provided enrichment comprises a pattern. For one or more (or all) of the enriched observables in the pattern, an additional level of enrichment is then carried out using graph-based analytics.

To that end, the enriched observables (as a pattern) are then provided to a graph database against which graph analysis is then run to identify a set of graph features representing a complete set of enriched features for the EDR alert. Representative graph features typically include alert-related data (e.g., number of alerts, number of alerts over some time period, the number of devices associated with the alerts, a percentage of alerts escalated, and the like), as well as one or more graph-related metrics, such as PageRank, Community, Centrality, Closeness and Degree for each node in the pattern. The output of this processing pipeline (that includes the threat intelligence and graph analysis enrichments) is an EDR normalized alert, which is then applied against a machine learning model that has been previously trained on prior EDR alerts that have been collected and processed in a similar manner. As a result, a prediction is generated for the EDR alert. Preferably, the prediction classifies the alert either as a 'true' positive or a 'false' positive, together with a confidence level representing a degree of confidence of the machine-generated prediction.

Depending on the machine confidence, the system handles the alert without providing the alert to an analyst. This is an auto-disposition. Thus, if the machine confidence level is sufficiently high, e.g., at or above a configurable threshold such as 90%, then the system takes an automated action. For example, and for a 'true' positive, the system automatically disposes of the alert, e.g., by escalating the alert, providing a command or control to tooling to initiate an automated remediation, or the like; conversely, if the machine confidence is sufficiently high for a 'false' positive, the system automatically closes the alert. In either case, the alert volume is reduced because the alert does not have to be handled by an analyst directly (alert suppression). When, however, the machine confidence is not sufficiently high for the alert, and in lieu of auto-disposition, the system returns an alert prediction (the 'true' or 'false' positive prediction, together with the machine's confidence in that prediction) to an analyst dashboard for the EDR alert. To facilitate the handling of the alert for which the machine confidence is not high enough to trigger automated disposition, preferably the alert prediction includes various types of additional information to assist the analyst in handling the alert expeditiously. To this end, the additional information includes, for example, the observables that were detected in the alert body, a historical analysis explaining the machine decision, and an identification of historically-related behaviors or events.

Auto-detection of observables for graph-based feature detection, together with the automated disposition of alerts where possible (based on the machine confidence in a prediction) greatly reduces overall analyst workload for the EDR system. Further, and even when a machine-based prediction does not have sufficient confidence to enable bypassing the analyst, the system provides the analyst with additional context and enrichment to facilitate expedited (or at least more efficient) alert handling.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which:

FIG. 7 depicts a representative EDR-generated alert;

FIG. 8 depicts a set of observables associated with an alert and enriched with threat intelligence data;

DETAILED DESCRIPTION OF AN ILLUSTRATIVE EMBODIMENT

Figure 1:
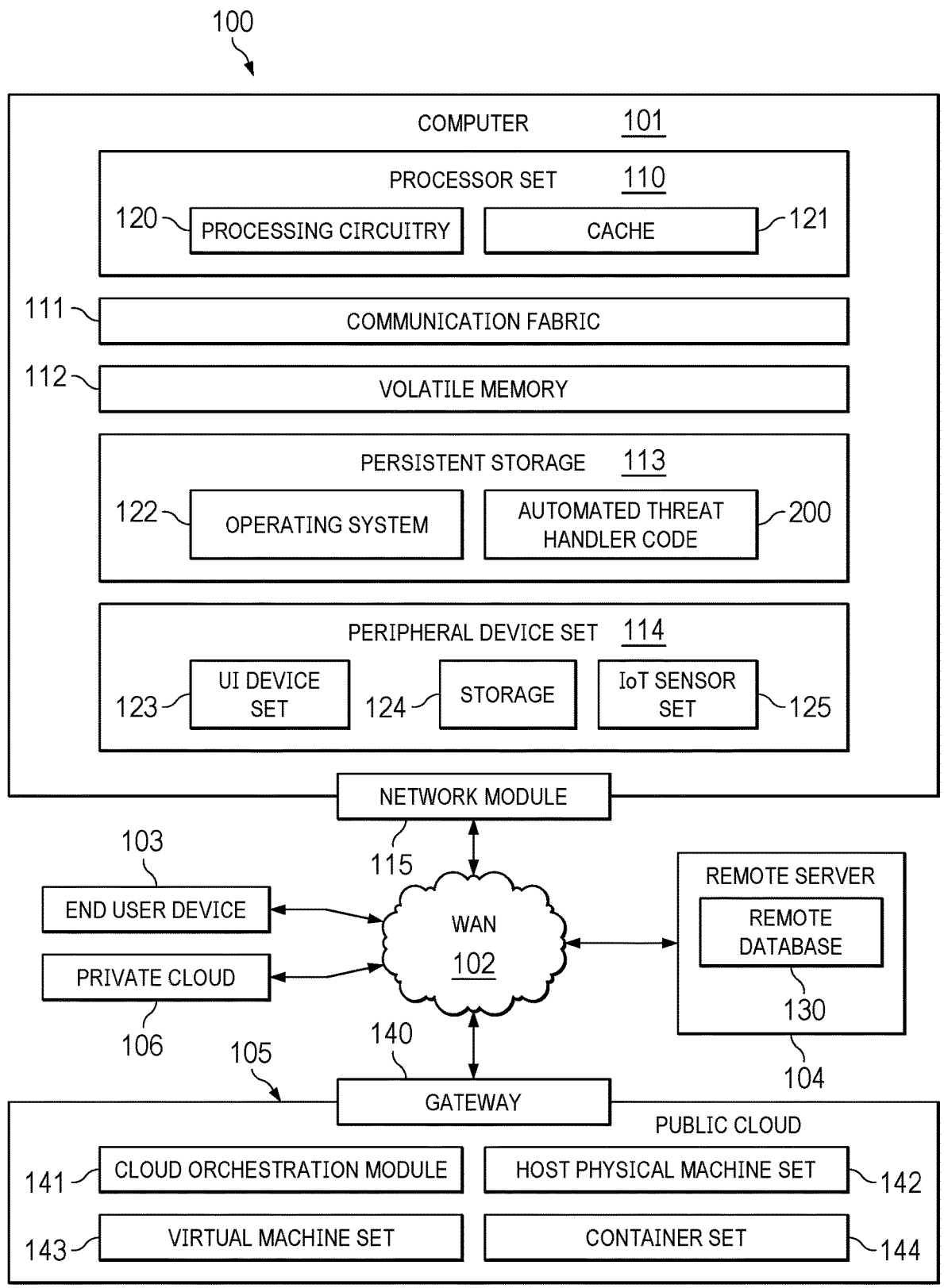
FIG. 1 depicts an exemplary block diagram of a data processing system in which exemplary aspects of the illustrative embodiments may be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as automated threat handler code 200 of this disclosure that uses a combination of automated observable detection, threat intelligence enrichment, graph analysis, and supervised machine learning, to machine-predict analyst behavior in classifying (as 'true' or 'false' positives) the EDR alerts, and to support (i) automated suppression of those alerts that the system classifies with sufficient confidence as either true or false, or (ii) for those alerts than cannot be so classified, the providing of recommendations to analysts to facilitate their activities, all as described in detail below. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as Linux, various known proprietary operating systems or open source Portable Operating System Interface-type operating systems that employ a kernel. The code included in block 200 typically includes at least some of the computer code involved in performing the inventive methods.

Peripheral Device Set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network Module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote Server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public Cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private Cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Endpoint Detection and Response (EDR) Systems

Figure 2:
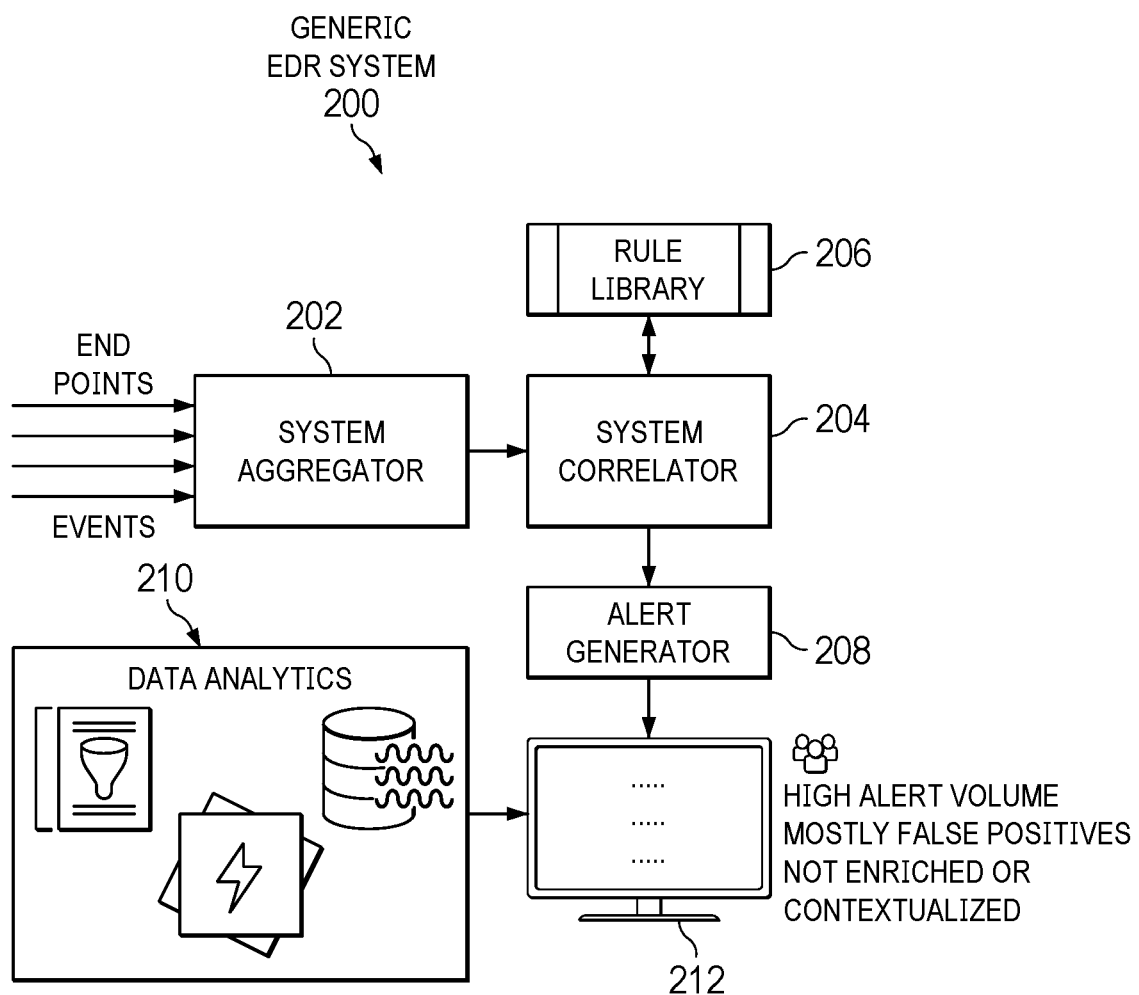
FIG. 2 depicts a representative EDR system in which the techniques of this disclosure may be implemented.

FIG. 2 depicts a representative known Endpoint Detection and Response (EDR) system 200. EDR is software designed to automatically protect an organization's end users, endpoint devices and IT assets against cyberthreats that get past antivirus software and other traditional endpoint security tools. Typically, it is deployed by a service provider as a managed service on behalf of an enterprise customer. A representative service of this type is IBM® Managed Security Services (MSS). EDR collects data continuously from all endpoints on the customer network—desktop and laptop computers, servers, mobile devices, IoT (Internet of Things) devices and more. It analyzes this data in real time for evidence of known or suspected cyberthreats, and it can respond automatically to prevent or minimize damage from threats it identifies. EDR threat detection analytics and automated response capabilities can identify and contain potential threats that penetrate the network perimeter before they can do serious damage, and these capabilities often do not require human intervention. EDR also provides tools that security teams can use to discover, investigate and prevent suspected and emerging threats on their own.

Specifically, EDR systems typically provide continuous endpoint data collection, real-time analysis and threat detection, automated threat response, threat isolation and remediation, and support for threat hunting. To this end, and as depicted, EDR system 200 typically comprises a set of components, namely, a system event aggregator 202, a system correlator 204, a rule library 206, an alert generator 208, data analytics 210, and a management console 212. The system aggregator 202 receives events from connected endpoints. An endpoint (not shown) is a networked device that runs systems management code (software) that enables management and monitoring of the endpoint by the EDR system. The endpoint typically is a data processing system. The system event aggregator continuously collects data— data on processes, performance, configuration changes, network connections, file and data downloads or transfers, end-user or device behaviors—from every endpoint device on the network. The data is stored in a central database or data lake, typically hosted in the cloud. Most EDR security solutions collect this data by installing a lightweight data collection tool, or agent, on every endpoint device; some may rely instead on capabilities in the endpoint operating system. EDR uses advanced analytics and machine learning algorithms to identify patterns indicating known threats or suspicious activity in real time, as they unfold. In general, EDR looks for two types of indicators: indicators of compromise (IOCs), which are actions or events consistent with a potential attack or breach; and indicators of attack (IOAs), which are actions or events associated with known cyberthreats or cybercriminals. To identify these indicators, and using system correlator 204, EDR correlates its own endpoint data in real time with data from threat intelligence services (not shown), which services deliver continuously updated information on new and recent cyberthreats—the tactics they use, the endpoint or IT infrastructure vulnerabilities they exploit, and more. Threat intelligence services can be proprietary (operated by the EDR provider), thirdparty, or community-based. In addition, many EDR solutions also map data to Mitre ATT&CK, a global knowledge base of hacker cyberthreat tactics and techniques to which the U.S. government contributes. Data analytics 210 comprise devices and algorithms that do their own sleuthing, comparing real time data to historical data and established baselines to identify suspicious activity, aberrant end-user activity, and anything that might indicate a cybersecurity incident or threat. They also can separate the 'signals,' or legitimate threats, from the 'noise' of false positives, so that security analysts can focus on the incidents that matter. EDR summarizes important data and analytic results in the central management console 212 that also serves as the solution's user interface (UI). From the console, security team members get full visibility into every endpoint and endpoint security issue, enterprise-wide, and launch investigations, threat responses and remediations involving any and all endpoints.

Automation provides EDR with a rapid response capability. In particular, and based on predefined rules in the rules library 206 set by the security team or learned over time by machine learning algorithms, the EDR solution through alert generator 208 can automatically alert security analysts to specific threats or suspicious activities. For example, alert generator 208 can automatically generate a 'track back' report that traces an incident or threat's every stop on the network, all the way back to its root cause, disconnect an endpoint device, or log an end-user off the network, halt system or endpoint processes, prevent an endpoint from executing (detonating) a malicious or suspicious file or email attachment, trigger antivirus or anti-malware software to scan other endpoints on the network for the same threat, and so forth. Once a threat is isolated, EDR provides capabilities that security analysts can use to further investigate the threat. For example, forensic analytics help security analysts pinpoint the root cause of a threat, identify the various files it impacted, and identify the vulnerability or vulnerabilities the attacker exploited enter and move around the network, gain access to authentication credentials, or perform other malicious activities. Armed with this information, analysts can use remediation tools to eliminate the threat. Remediation might involve destroying malicious files and wiping them off endpoints, restoring damaged configurations, registry settings, data and application files, applying updates or patches to eliminate vulnerabilities, and updating detection rules to prevent a recurrence.

As also mentioned, the EDR system may include support for threat hunting (also called cyberthreat hunting). Threat hunting is a proactive security exercise in which a security analyst searches the network for as-yet unknown threats, or known threats yet to be detected or remediated by the organizations automated cybersecurity tools. Threat hunters use a variety of tactics and techniques, most of which rely on the same data sources, analytics and automation capabilities EDR uses for threat detection, response and remediation. To support threat hunting, EDR makes these capabilities available to security analysts via UI-driven or programmatic means, so they can perform ad-hoc searches data queries, correlations to threat intelligence, and other investigations. EDR tools intended specifically for threat hunting include everything from simple scripting languages (for automating common tasks) to natural language querying tools.

As noted above, and while EDR solutions provide significant advantages, they have certain drawbacks, mainly due to high alert volume, the existence of many false positives, and the lack of alert enrichment or contextualization. These issues lead to analyst fatigue and delayed investigations on more pertinent alerts. The techniques of this disclosure address these and other deficiencies in known EDR solutions.

Automated Detection of Observables, and Automated Alert Disposition Using Machine Learning With the above as background, the techniques of this disclosure are now described. As will be seen, the approach herein typically is implemented in association with an EDR system (such as depicted in FIG. 2) to provide an Automated Threat Handler for Endpoint and Network Assets. The solution may be an adjunct (add-on) to the EDR system, it may be integrated into the EDR system, or it may be provided as a standalone system or function, e.g., as a microservice. As will be described, the system uses a combination of automated observable detection, threat intelligence enrichment, graph analysis, and supervised machine learning to machine-predict analyst behavior in classifying (as 'true' or 'false' positives) the alerts that are generated by an EDR system, and to support either (i) automated alert suppression for those alerts than can be classified with sufficient confidence, or (ii) for those alerts than cannot be classified with sufficient confidence, the providing of recommendations to analysts to facilitate their responsive activities.

In particular, the approach herein provides for a method, apparatus and computer program product for suppressing alert volume and reducing time for alert processing in association with an Endpoint Detection and Response (EDR) system. This benefits are achieved using a machine-based prediction service (e.g., a microservice) that operates in association with or as part of the EDR system. In response to receipt of an alert from the EDR system, the body of the alert is analyzed to automatically detect one or more "observables" in the alert that are indicative of potentially suspicious activity. Representative observables include, for example, high-risk hashes, encoded commands, number of command scripts, the existence of IP addresses in command lines, presence of a Shell script, and the like). The set of one or more observables (e.g., the value of a hash, a particular IP address identified in a command line, etc.) identified in the alert body are then evaluated against a threat intelligence service, which service returns the set of observables (or at least some of them) enriched with additional information (gleaned from the threat intelligence service) and useful to evaluate a degree of risk that the observable presents. The set of observables and their threat intelligence service-provided enrichment comprises a pattern. An observable may sometimes be referred to herein as a "feature." For one or more (or all) of the enriched observables in the pattern, an additional level of enrichment is then carried out using graph-based analytics.

To that end, the enriched observables (as a pattern) are then provided to a graph database against which graph analysis is then run to identify a set of graph features representing a complete set of enriched features for the EDR alert. Representative graph features typically include alert-related data (e.g., number of alerts, number of alerts over some time period, the number of devices associated with the alerts, a percentage of alerts escalated, and the like), as well as one or more graph-related metrics such as PageRank, Community, Centrality, Closeness and Degree for each node in the pattern. Some or all of the information gleaned from the graph-related enrichments are then included in the alert. The output of this alert processing pipeline is an EDR normalized alert, which is then applied against a machine learning model that has been previously trained on prior EDR alerts that have been collected and processed in a similar manner. As a result, a prediction is generated for the particular alert.

Preferably, the prediction classifies the alert either as a 'true' positive or a 'false' positive, together with a confidence level representing a degree of confidence of the machine-generated prediction. Depending on the machine confidence, the system then handles the alert without providing the alert to an analyst. As noted above, this is auto-disposition. Thus, if the machine confidence level is sufficiently high, e.g., at or above a configurable threshold such as 90%, then the system takes an automated action. For example, for a 'true' positive, the system automatically disposes of the alert, e.g., by escalating the alert, providing a command or control to tooling to initiate an automated remediation, or the like; conversely, if the machine confidence is sufficiently high for a 'false' positive, the system automatically closes the alert. In either case, the alert volume is reduced because the alert does not have to be handled by an analyst directly. This is referred to above as alert suppression. When, however, the machine confidence is not sufficiently high, and in lieu of auto-disposition, the system returns an alert prediction, e.g. to an analyst dashboard for the EDR alert. To facilitate the handling of the alert for which the machine confidence is not high enough to trigger automated disposition, preferably the alert prediction includes various types of information to assist the analyst in handling the alert expeditiously. The information includes, for example, the observables that were detected in the alert body, a historical analysis explaining the machine decision, and an identification of historically-related behaviors (e.g., rare events).

Auto-detection of observables for graph-based feature detection, together with the automated disposition of alerts where possible (based on the machine confidence in a prediction) greatly reduces overall analyst workload for the EDR system. Further, and even where a machine-based prediction does not have sufficient confidence to enable bypassing the analyst, the system provides the analyst with additional context and enrichment to facilitate expedited (or at least more efficient) alert handling.

Figure 3:
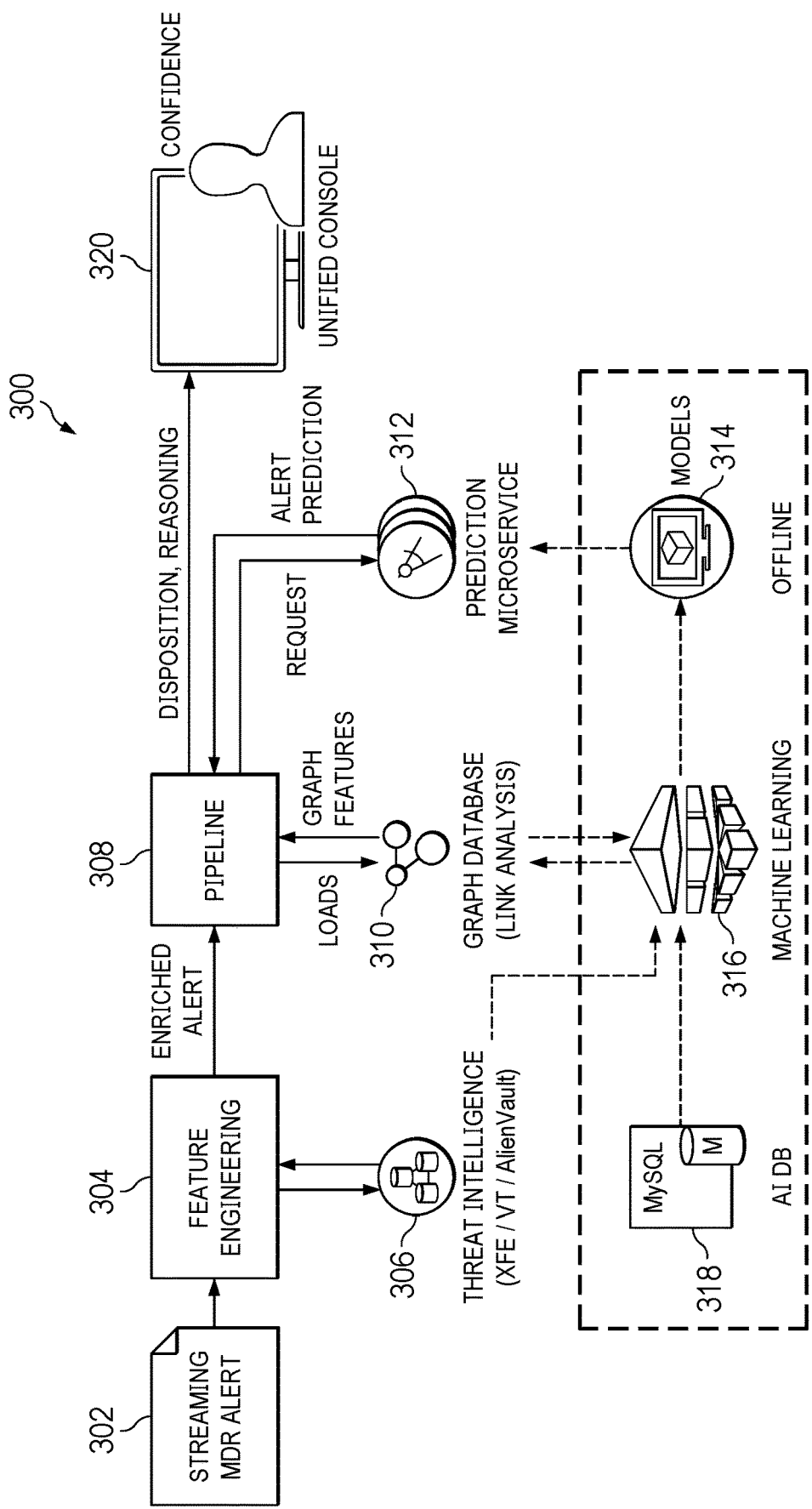
FIG. 3 depicts a high level representation of the architecture of this disclosure for automated threat handling for endpoint and network assets.

FIG. 3 is a high level depiction of the threat handling solution 300 of this disclosure. As will be described, in one embodiment this solution is implemented as a microservice that is associated with the EDR system. Microservices is an application architecture in which an application is composed of many discrete, network-connected components that are called microservices. This type of architecture enables large monolithic applications to be broken down into small services. A single network-accessible service is the smallest deployable unit for a microservices application. Each service runs in its own process, e.g., a container or other lightweight deployment mechanism.

As depicted, the solution is coupled downstream from the EDR system alert generator (such as generator 208 in FIG. 2) and receives streaming MDR (Managed Detection and Response) alerts 302. In particular, an alert obtained from the source EDR system is received and gets routed from the alert generator to the automated threat handler microservice of this disclosure. In this example embodiment, the alert is subject to feature engineering, which is represented generated by reference numeral 304. As will be described in detail below, feature engineering 304 involves identifying/detecting observables in the alert, and associating context information and enrichment to the alert based on those detected observables. Typically, observables are hidden in the alert body, but they may also be present in the alert body directly.

Observables include, without limitation, suspicious IP addresses, high-risk hash values like MD5, SHA256, embedded encoded commands, download commands, and suspicious shell (e.g. PowerShell) scripts. There are the principal features used for data enrichment and feature engineering, but they are not intended to be limiting. To that end, the first part of feature engineering 304 includes auto-detecting observables, e.g., in the command line of the input data as identified in the alert. Then, and as depicted in FIG. 3, and after the observables are identified, the observables (or their values) are run through a Threat Intelligence service 306, such as IBM X-Force Exchange (XFE), to determine whether there is any known threat intelligence about the observable(s). IBM X-Force Exchange, supported by human- and machine-generated intelligence, is a cloud-based threat intelligence platform that allows users to consume, share and act on threat intelligence. Other threat intelligence services (e.g., AlienVault, now AT&T® Cybersecurity) may be used for this purpose.

The threat intelligence service 306 typically is accessed in an automated manner, e.g., via an Application Programming Interface (API). The Threat Intelligence service 306 parses and normalizes alert data received in the alert and returns base data (the one or more observables) supplemented with the threat intelligence. The observables, having now been enriched with threat intelligence data, are then used as further input(s) to a next stage of feature engineering involving graph analysis. In this aspect, the observables are provided to pipeline 308, which cleans and formats the observables into a pattern (an alert graph), and loads the data into a graph database (DB) 310 for graph analysis. This portion of the feature engineering involves computing graph features that identify interrelationships between and among the nodes of the pattern graph, as well as the importance of each node in the graph. A set of graph features results from the graph analysis feature engineering. Graph features include, without limitation, alert-related data (e.g., number of alerts, number of alerts over some time period, the number of devices associated with the alerts, a percentage of alerts escalated, and the like), as well as one or more graph-related metrics such as PageRank, Community, Centrality, Closeness and Degree for each node in the pattern. As noted above, some or all of the information gleaned from the graph-related enrichments are included in the alert. The output of this alert processing pipeline 308 (that includes the threat intelligence and graph analysis enrichments as applied to the detected observables) is sometimes referred to herein as an EDR normalized alert.

As depicted, the EDR normalized alert is then provided as a Request to a prediction microservice 312. The prediction microservice 312 has an associated model 314 that has been built by supervised machine learning 316 using training data collected from prior analyst behavior and stored in AI database 318. The prior analyst behavior are the datasets from prior alerts previously seen by the system over some time period (e.g., measured in days, weeks, months, or the like), together with their associated "labels" and related confidence level information. Stated another way, supervised machine learning is performed on the dataset with enriched features as the predictors and prior analyst behavior as the labels. The outcome of the machine learning are precomputed scoring models that are precomputed scoring models that predict the alert outcome as 'true' or 'false' positive. As will be described, the system also provides machine confidence and, in certain circumstances, additional information such as key observables seen, an easyto-read explanation for the recommendations, and statistical analysis of similar behavior seen in the past.

Referring back to FIG. 3, in response to receipt of the Request, the prediction microservice 312 applies the EDR normalized alert to the machine learning model 314 and generates a prediction for the particular alert (an "alert prediction"). Each alert prediction includes an indication of whether the alert is deemed by the system to be a 'true' or 'false' positive, and a degree of confidence that the machine has in this prediction. Depending on the machine's confidence in the prediction, one of several actions are taken. In particular, if the machine's confidence in the prediction is below a configurable confidence level threshold, then the alert prediction is further enriched and forwarded by the pipeline 308 to an analyst dashboard in unified console 320. Unified console 320 typically is a dashboard shared by a set of analysts that are responsible for handling the EDR alerts. As depicted, and in this scenario, the alert prediction typically includes additional information (e.g., the observables, the machine's reasoning, historical or statistical information about similar alerts or events, and the like) and that can be used to assist an analyst in handling the alert.

If, however, the machine's confidence in a prediction is sufficiently high, there is no reason to forward the alert onward for handling by an analyst. In such case, and according to this disclosure, the pipeline 308 is further configured to make an automated disposition of the alert. In this manner, the alert is suppressed, thereby reducing the overall volume of alerts that are exposed to the set of analysts via the dashboard or otherwise.

When deployed in an EDR environment (or more generally in association with a managed security service), the technique described above reduces overall analyst workload by suppressing alert volume. For alerts that are not subject to auto-disposition, the system also reduces the time for alert processing by providing threat intelligence-enriched data with auto-detected observables and machine recommendations.

Figure 4:
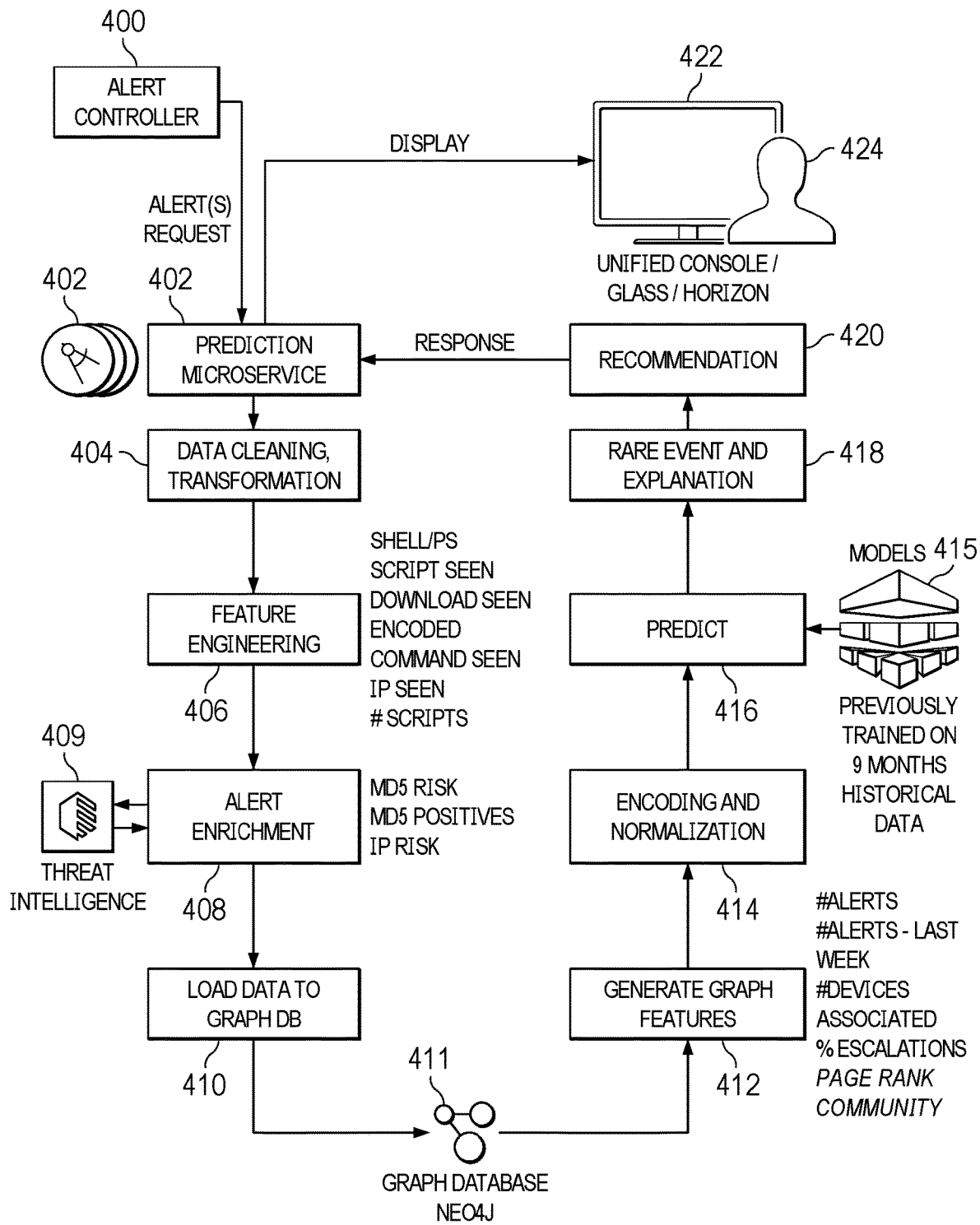
FIG. 4 depicts a detailed representation of a preferred processing workflow.

FIG. 4 depicts a more detailed representation of the above-described automated processing. As noted above, the system receives alerts from an EDR alert controller 400. The alert(s) are received at the prediction microservice 402. The prediction microservice 402 routes the alerts for data cleaning and transformation 404 as necessary to facilitate the further processing. After data cleaning and transformation, the feature engineering 406 is initiated to detect the observables in the alert. At 408, the alert is enriched by providing the identified observables to the threat intelligence service 409. The resulting threat intelligence-enriched observables comprise the pattern (of observables) for the alert that, at step 410, this dataset is then loaded to the graph database 411 for graph feature extraction. Using graph analysis 412, graph features are generated. Encoding and normalization 414 are then carried out on the generated graph features to facilitate the subsequent machine learning prediction. To that end, the system has available for prediction one or more models 415 that were previously trained on historical data as has been described. Models are updated periodically or continuously, e.g., as the system generates predictions. At 416, a Predict operation is carried out for the current dataset using the models 415 to generate the prediction for the current alert being processed. As noted, the prediction (whether the alert is a 'true' or 'false' positive) also includes a machine confidence in that prediction. At 418, the system also generates additional information such as an explanation, statistical analysis similar behavior seen in the past, and the like. At 420, the system generates a recommendation for handling, which is returned to the prediction microservice 402. As noted above, whether the particular alert is suppressed (disposed of automatically) or returned for analyst handling typically depends on the machine confidence level associated with the alert prediction. When the alert is not auto-disposed, it is provided for display to the analyst console 422, where it is then picked up for handling by an analyst 424.

Figure 5:
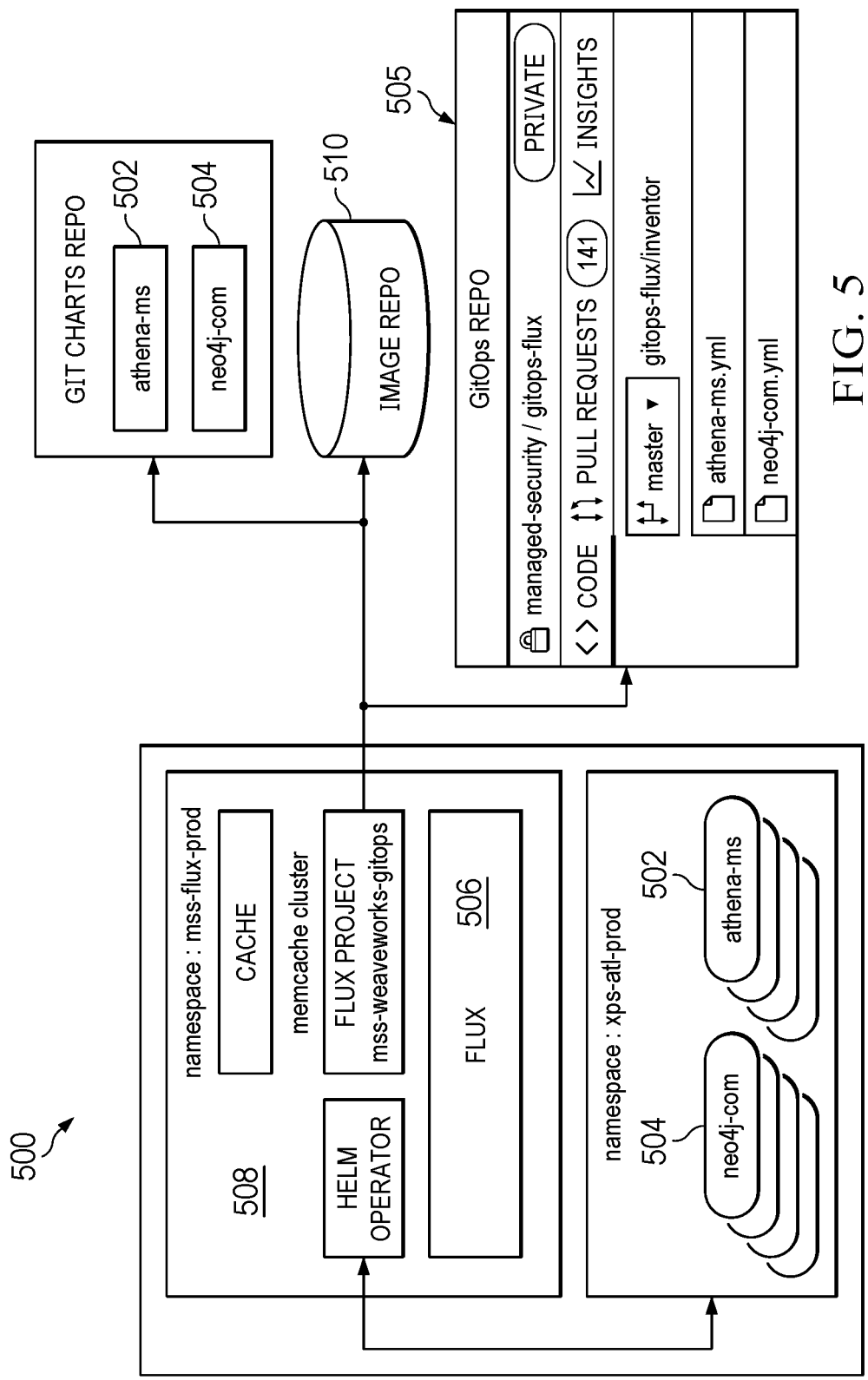
FIG. 5 depicts a representative implementation of the system as containerized cloud native applications that are portable and that can be freely-scaled and deployed on multiple clusters and regions, e.g., as a cloud-based solution.

In one non-limiting embodiment, the above-described solution may be implemented as a set of containerized cloud native applications that are portable and that can be freely-scaled and deployed on multiple clusters and regions. FIG. 5 depicts a representative architecture. In this embodiment, there are two distinct modules deployable: a Python-based microservice 502, and a Neo4J graph database 504. Preferably, the deployment is automated, flexible, and on-demand infrastructure-oriented. For example, and without limitation, the deployment may be managed by a container platform 500, such as Red Hat® OpenShift®, and a continuous delivery infrastructure 506, such as Weaveworks Flux, and GitHub Pull Requests, an approach to Kubernetes cluster management and application delivery called GitOps 505. This deployment approach affords an enterprise more control and ownership over the release process, enabling true continuous delivery with low risk, a very detailed audit trail, and increased operational velocity. To this end, a YAML (a human-readable data serialization language) file on a managed service Github repository for each deployable module enforces system conformance, ensuring that the OpenShift cluster configuration matches the configuration in the repository, and it automates the deployment, as it uses an operator 508 in the cluster to trigger deployments inside OpenShift. The operator manages all relevant image repositories 510, detects new images, triggers deployments, and updates the desired running configurations based on this file. Upon the deployment, preferably a timed scheduler activity also is configured on the cluster to execute periodically (e.g., daily) to provide model training. The model training in then pushed and stored on an OpenShift cluster persistent volume (PV). The PV is accessed by the Python microservice fetching the most accurate version of the model.

Figure 6:
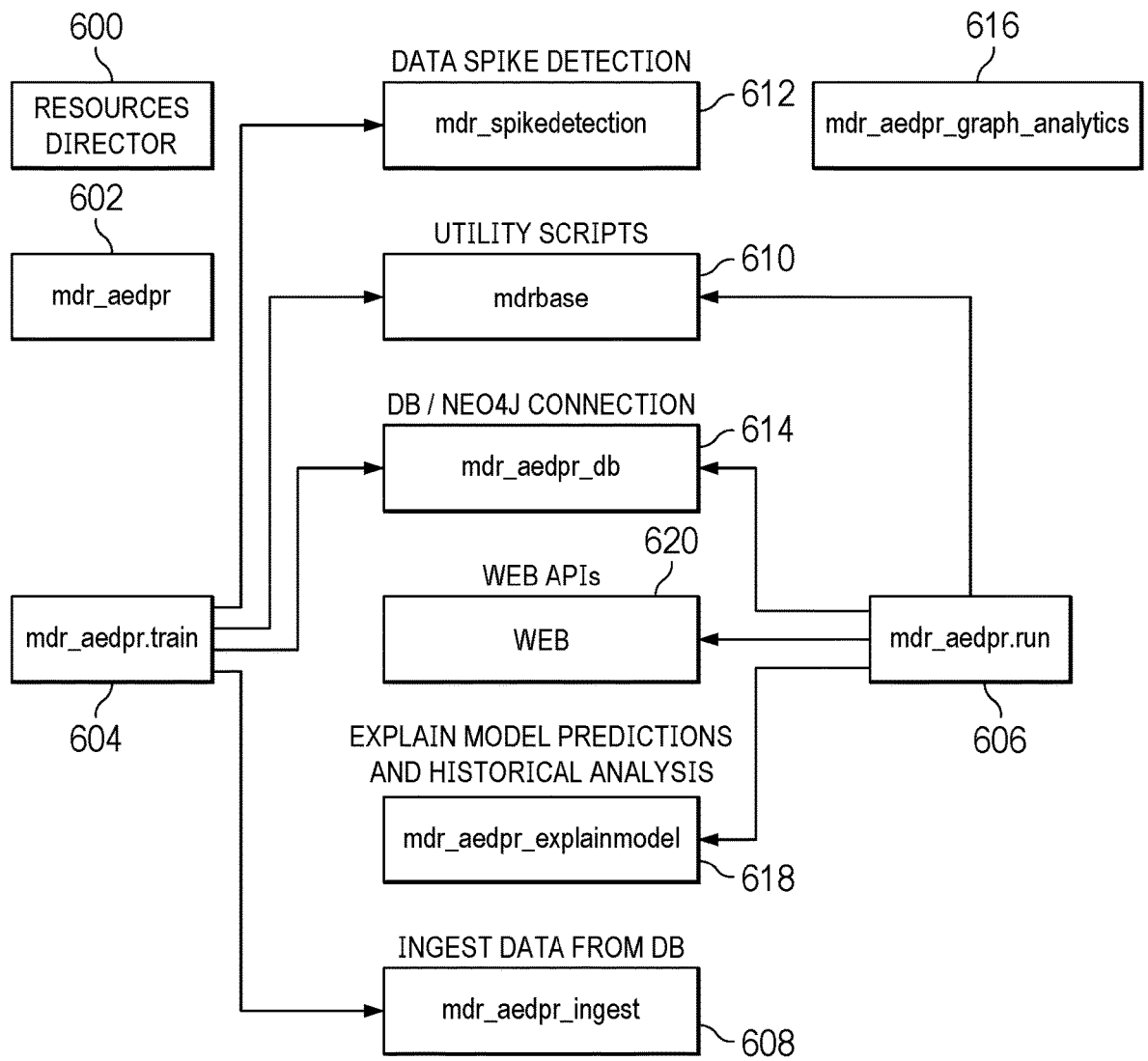
FIG. 6 depicts the solution implemented as a Service Oriented Architecture (SOA)

FIG. 6 depicts the solution implemented as a Service Oriented Architecture (SOA). In particular, the processing pipeline is segregated in different modules to provide loose coupling. Each module has a set of methods (services) that have been exposed as method APIs. The modules communicate with each other via these APIs. A representative architecture is as follows:

The Resources Director module 600 is where training and prediction-related resources reside, including cypher queries and SQL queries. Resources like models and dictionaries are generated, then used during the prediction. They reside in a resources directory.

The mdr_aedpr module 602 is the main module where main pipelines for training and the prediction reside. This module has two (2) submodules: rndr_aedrp.train, and mdr_aedpr.run. The mdr_aedrp.train submodule 604 supports a training pipeline. From this training pipeline other modules that are required to generate the training module get called, one after the other as required. This pipeline also generates the model that is saved in the resources directory. The mdr_aedpr.run submodule 606 is used to design the prediction pipeline. From here, all other modules related to the prediction get called, one after the other as required. This submodule also generates a set of responses for part of the prediction.

The module mdr_aedpr_ingest 608 is used to help generate/prepare training data by pulling that data from a database.

The module mdrbase 610 comprises the utility scripts that are required by the various modules in the architecture.

The module mdr_spikedetection 612 is used to remove spikes detected in the training data and, in response, to return spike-free data. This results in removing any biases in the training data.

The module mdr_aedpr_db 614 comprises all of the database (SQL/Neo4j etc.) connection APIs along with the scripts required to generate database (DB) clients.

The module mdr_aedpr_graph_analytics 616 comprises the APIs related to graph analytics. This includes data ingestion in neo4j, running graph analysis on the ingested data, and returning machine learning features (e.g. PageRank, Community Detection, etc.) for training.

The module mdr_aedpr_explainmodel 618 comprises the APIs related to model explanation. It provides the APIs related to model explanation. In particular, it provides the explanation behind the model's alert prediction. The explanation typically comprises certain observations made during the prediction together with a historical analysis of the similar alerts observed on the whole training data or on a customer-to-customer basis.

The module web 620 exposes the system as a python microservice. This module receives an alert request from the alert controller, which in turn sends an alert to the prediction pipeline and compiles an API response with the results received from the prediction pipeline. The final response is then sent back to either the controller or the display.

The implementations depicted in FIG. 5 and FIG. 6 are not intended to be limiting.

The managed service (or the automated threat handler itself) typically implements a comprehensive audit process to ensure that the machine learning of this disclosure is provided with accurate and current feedback. In particular, and as analysts make a disposition decision based on the information provided by the system, they can 'like' or 'dislike' the machine recommendations and supporting explanations, thereby providing inputs to future learnings. In addition, preferably a periodic (e.g., daily) audit is performed, e.g., on high confidence alerts, to ensure that the solution is not automating dispositions incorrectly. As noted, preferably the audit feedback is incorporated into the learning process.

Alert Processing Example

Figure 9:
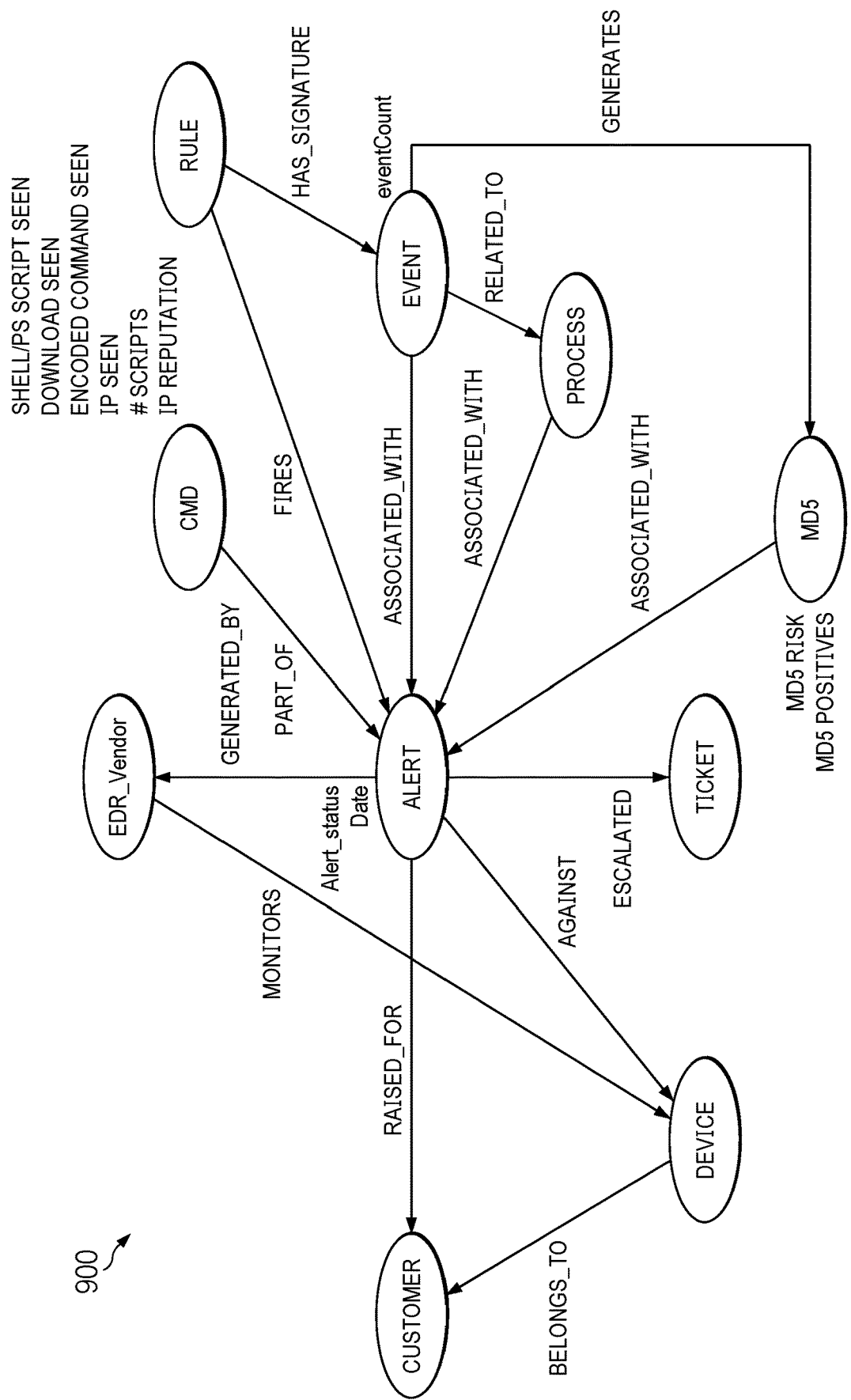
FIG. 9 depicts a generalized high-level graph data model for entities (nodes) and relationships for a customer alert.
Figure 10:
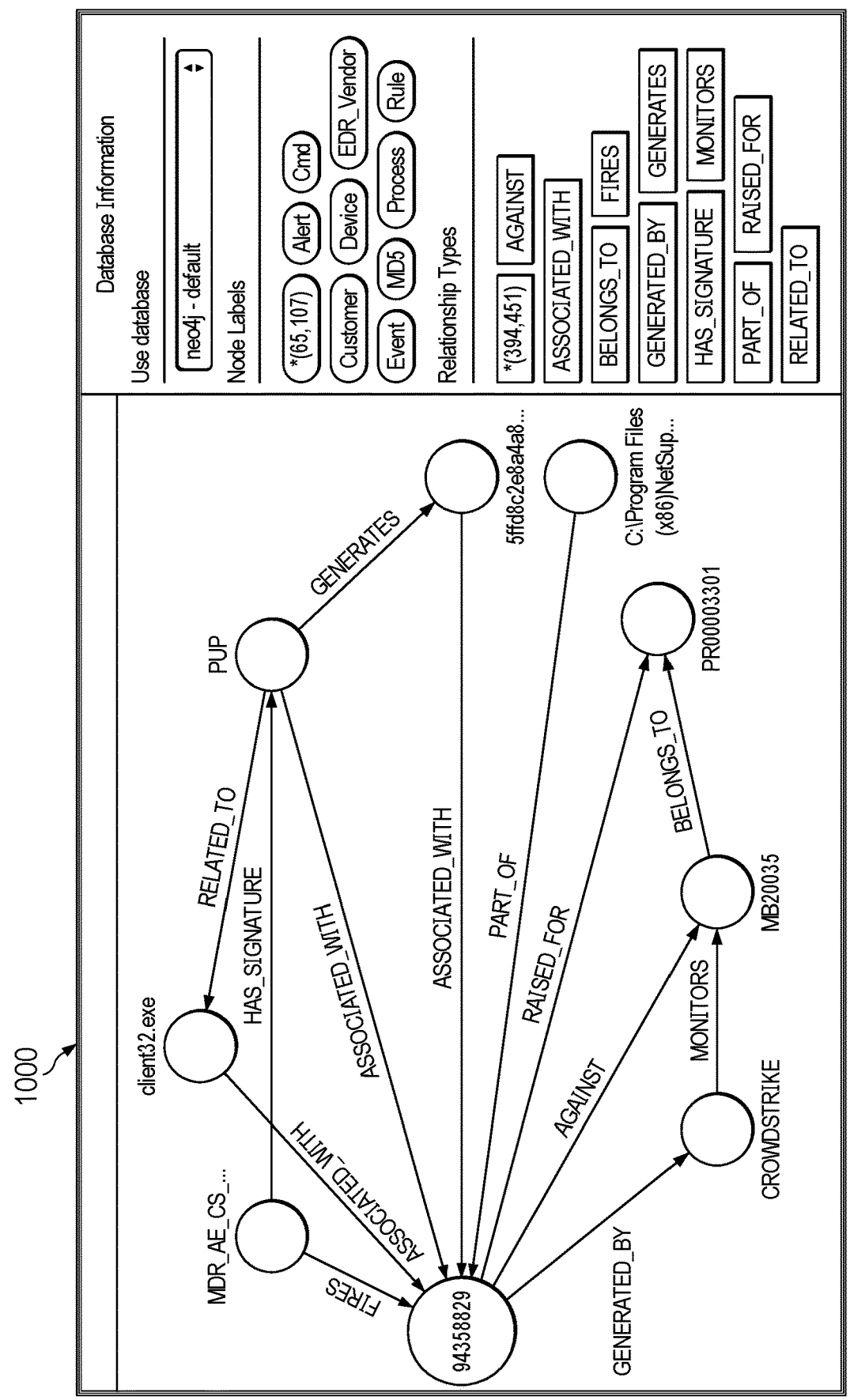
FIG. 10 depicts a visualization of the of the customer alert data model using a Neo4J browser.

To illustrate the above-described processing, FIG. 7 depicts an example EDR alert 700. As depicted, the alert comprises a set of attributes on the left side, and the values of the attributes on the right side. Some of the values may be masked as depicted. Once the alert data is received in the system, as previously described it is automatically enriched, supplemented with threat intelligence, and contextualized for detecting specific attributes, namely, the observables. FIG. 8 depicts the observables 800, an indication or count 802 for each observable, and the threat intelligence 804. In the example, the MD5_Risk observable is "high" because there were twenty-one (21) instances of the MD5 signature seen in the threat intelligence data. The data also shows that there are no PowerShell or Shell scripts, or download or CURL scripts seen in the command line (cmdline). One command script was identified. As noted above, the next level of enrichment and feature engineering comes from graph analytics. In one embodiment, the system uses Neo4J as the backend graph database, however, this is not a limitation as the solution may be implemented using any graph database. A high-level graph data model 900 for entities (nodes) and relationships for a typical customer alert is depicted in FIG. 9. As depicted, the node Cmd refers to the command line, and the observables (Shell/PS script seen, Download seen, Encoded command seen, IP address seen, # of scripts, IP reputation, etc.) are listed as properties of the Cmd node. FIG. 10 depicts the customer alert data model 1000 visualized using a Neo4J browser.

The techniques herein have significant advantages. They provide for a unique application of machine learning and graph data science to reduce alert volumes by auto-disposing alerts for EDR systems. In the approach, graph data science and analytics are employed to identify community behavior and relationships, using the identified features to enhance machine learning prediction accuracy. The system automatically detects objects of interest (observables) in EDR alerts that help both machine and analyst in quicker decision-making. Rare event detections and auto-generated explanations are further provided to support machine recommendations. The approach herein conveniently leverages supervised machine learning on analyst actions to learn threat severity. More generally, the approach provides for detecting and disposing of alerts based on supervised machine learning techniques and graph analytics. The supervised machine learning and graph analytics are used to establish relationships between the nodes in a graph, and to use those features for guiding analyst behavior. As has been described, the approach enables supervised machine learning and graph analytics for offense/alert disposition.

Generalizing, the method according to this disclosure may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 1) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

As also depicted in FIG. 1, the scheme described herein may be implemented in or in conjunction with various server-side architectures including simple n-tier architectures, web portals, federated systems, and the like. The techniques herein may also be practiced in whole or in part in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the above-described functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the code (a combination of automated observable detection, threat intelligence enrichment, graph analysis, supervised machine learning, and alert handling) of this disclosure is implemented in a special purpose computer, preferably in software executed by one or more processors. The software is maintained in one or more data stores or memories associated with the one or more processors, and the software may be implemented as one or more computer programs. Collectively, this special-purpose hardware and software comprises the system described above.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

While the techniques described herein are particularly adapted for EDR alert handling, this is not a limitation either. The particular alert may be generated by some other security service, system, device or solution.

The techniques herein provide for improvements to another technology or technical field, namely, EDR systems, as well as improvements to the operational capabilities of such systems when used in the manner described.

Having described the subject matter, what is claimed is as follows.

The invention claimed is:

1. A method of threat response associated with an endpoint detection and response (EDR) system, wherein a threat is identified in an alert, comprising:
responsive to receipt of an alert, automatically detecting one or more observables in the alert, wherein an observable is information that is potentially indicative of suspicious activity;
enriching the one or more observables detected in the alert using threat intelligence to generate a pattern;
applying the pattern through a graph analysis to identify a set of one or more graph features associated with the pattern;
generating a prediction by applying the set of one or more graph features through a machine learning model that has been trained to classify inputs of graph features to outputs of prior analyst behavior, the prediction having an associated confidence level; and
based at least in part on the confidence level, taking an action that is one of the group consisting of: automated suppression of the alert, and returning the prediction together with additional context information to facilitate alert handling.

2. The method as described in claim 1 wherein the observables are detected within input data relating to the alert and are one of the group consisting of: IP addresses, hash values, embedded commands, download commands, command scripts, presence of a shell script, command scripts, detected within input data relating to the alert.

3. The method as described in claim 1 wherein the one or more graph features are one of the group consisting of: PageRank, Community, Centrality, Closeness and Degree, for one or more nodes in a graph associated with the pattern.

4. The method as described in claim 1 wherein the machine-generated prediction is that the alert is one of the group consisting of: a true positive, and a false positive.

5. The method as described in claim 1 further including training the machine learning model in a supervised manner using prior analyst behavior as labels and the set of graph features as predictors.

6. The method as described in claim 1 wherein the additional context information includes one or more of the group consisting of: the observables that were detected in the alert, a historical analysis explaining the machine-generated prediction, and an identification of historically-related behaviors or events.

7. The method as described in claim 1 wherein the method is implemented as a microservice in association with the EDR system.

8. An apparatus, comprising:
a processor;
computer memory holding computer program instructions executed by the processor for threat response associated with an endpoint detection and response (EDR) system, wherein a threat is identified in an alert, the computer program instructions comprising program code configured to:
responsive to receipt of the alert, automatically detect one or more observables in the alert, wherein an observable is information that is potentially indicative of suspicious activity;
enrich the one or more observables detected in the alert using threat intelligence to generate a pattern;
apply the pattern through a graph analysis to identify a set of one or more graph features associated with the pattern;
generate a prediction by applying the set of one or more graph features through a machine learning model that has been trained to classify inputs of graph features to outputs of prior analyst behavior, the prediction having an associated confidence level; and
based at least in part on the confidence level, take an action that is one of the group consisting of: automated suppression of the alert, and returning the prediction together with additional context information to facilitate alert handling.

9. The apparatus as described in claim 8 wherein the observables are detected within input data relating to the alert and are one of the group consisting of: IP addresses, hash values, embedded commands, download commands, command scripts, presence of a shell script, command scripts, detected within input data relating to the alert.

10. The apparatus as described in claim 8 wherein the one or more graph features are one of the group consisting of: PageRank, Community, Centrality, Closeness and Degree, for one or more nodes in a graph associated with the pattern.

11. The apparatus as described in claim 8 wherein the machine-generated prediction is that the alert is one of the group consisting of: a true positive, and a false positive.

12. The apparatus as described in claim 8 wherein the program code is further configured to train the machine learning model in a supervised manner using prior analyst behavior as labels and the set of graph features as predictors.

13. The apparatus as described in claim 8 wherein the additional context information includes one or more of the group consisting of: the observables that were detected in the alert, a historical analysis explaining the machine-generated prediction, and an identification of historically-related behaviors or events.

14. The apparatus as described in claim 8 wherein the method is implemented as a microservice in association with the EDR system.

15. A computer program product in a non-transitory computer readable medium, the computer program product holding computer program instructions executed by a processor for threat response associated with an endpoint detection and response (EDR) system, wherein a threat is identified in an alert, the computer program instructions comprising program code configured to:
responsive to receipt of the alert, automatically detect one or more observables in the alert, wherein an observable is information that is potentially indicative of suspicious activity;
enrich the one or more observables detected in the alert using threat intelligence to generate a pattern;
apply the pattern through a graph analysis to identify a set of one or more graph features associated with the pattern;
generating a prediction by applying the set of one or more graph features through a machine learning model that has been trained to classify inputs of graph features to outputs of prior analyst behavior, the prediction having an associated confidence level; and
based at least in part on the confidence level, take an action that is one of the group consisting of: automated suppression of the alert, and returning the prediction together with additional context information to facilitate alert handling.

16. The computer program product as described in claim 15 wherein the observables are detected within input data relating to the alert and are one of the group consisting of: IP addresses, hash values, embedded commands, download commands, command scripts, presence of a shell script, command scripts, detected within input data relating to the alert.

17. The computer program product as described in claim 15 wherein the one or more graph features are one of the group consisting of: PageRank, Community, Centrality, Closeness and Degree, for one or more nodes in a graph associated with the pattern.

18. The computer program product as described in claim 15 wherein the machine-generated prediction is that the alert is one of the group consisting of: a true positive, and a false positive.

19. The computer program product as described in claim 15 wherein the program code is further configured to train the machine learning model in a supervised manner using prior analyst behavior as labels and the set of graph features as predictors.

20. The computer program product as described in claim 15 wherein the additional context information includes one or more of the group consisting of: the observables that were detected in the alert, a historical analysis explaining the machine-generated prediction, and an identification of historically-related behaviors or events.

* * * * *